UNITED STATES PATENT OFFICE.

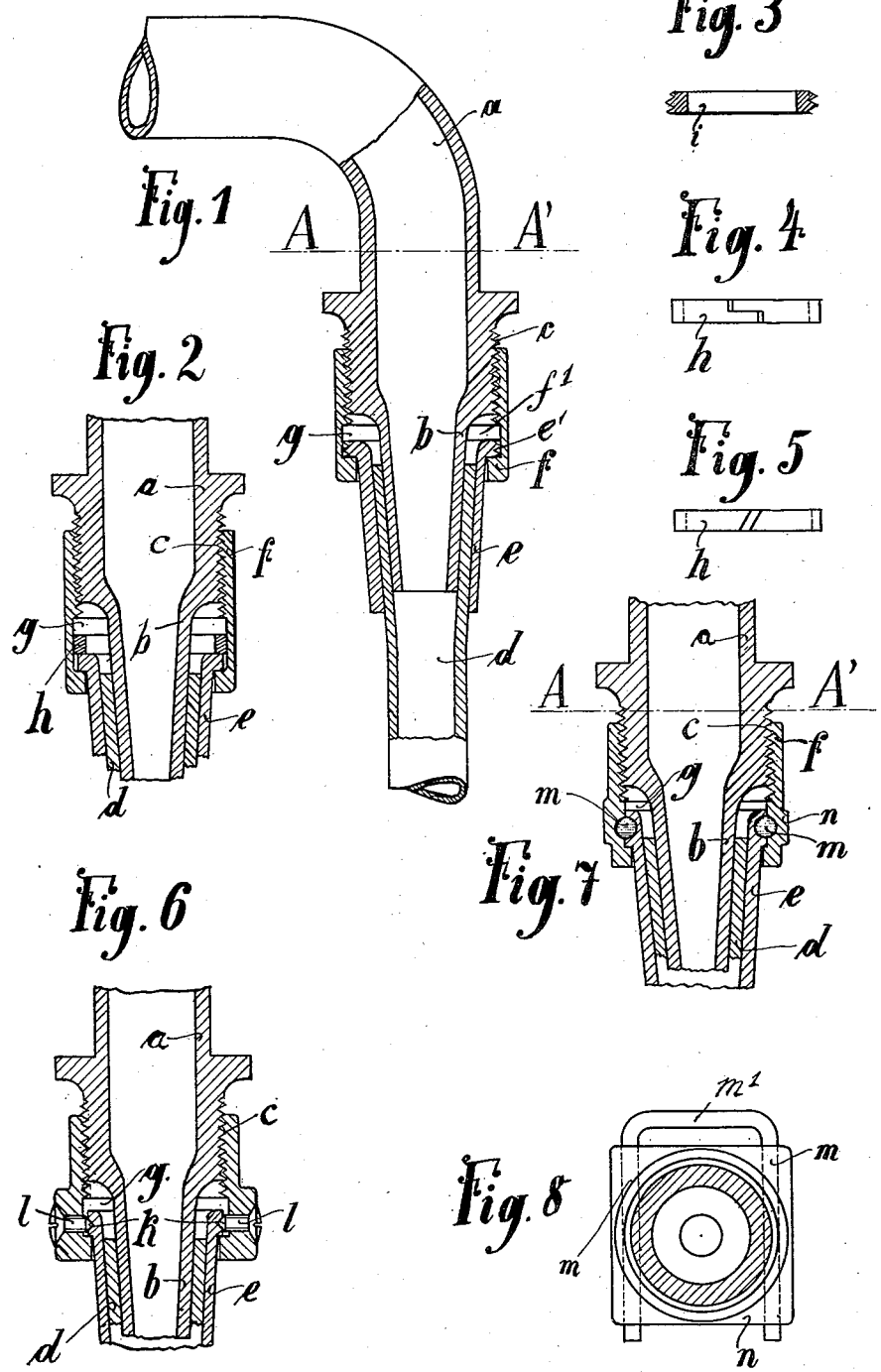

PETER KRISCHER, OF HAGEN, GERMANY.

HOSE-COUPLING.

951,283.    Specification of Letters Patent.    Patented Mar. 8, 1910.

Application filed February 23, 1909. Serial No. 479,485.

*To all whom it may concern:*

Be it known that I, PETER KRISCHER, a subject of the German Emperor, residing at Hagen, in Westphalia, in Germany, have invented certain new and useful Improvements in Hose-Couplings, of which the following is a specification.

The present invention relates to a coupling by means of which hose of any kind can be connected to cocks or other hose, the coupling being of that class in which the hose is gripped on a conical tube by means of a nut or cap and an exterior hollow cone. Over known devices of this kind the present invention differs in the fact that the hollow cone operated by the nut or cap in order to rigidly secure the hose, is connected to the nut in such a manner that on releasing said nut when the connection has to be broken a releasing movement of the hollow cone also takes place by unscrewing the nut itself. The connection of the hollow cone with the nut has the further advantage that both parts cannot be separately lost.

The object of the invention is attained preferably by inserting a ring between the hollow cone and the thread of the nut, which ring on breaking the connection exercises pressure on the hollow cone and removes it from the tube or member to which the connection is made. By dispensing with a special ring, the projecting edge of the hollow cone can for example be provided with a thread, and the hollow cone be connected to the nut by means of pins, screws or the like.

Embodiments of the invention are shown in the accompanying drawing in which—

Figure 1 is a sectional elevation showing the coupling in section. Fig. 2 is a section of a modification. Figs. 3, 4 and 5 are detail views of rings hereinafter referred to. Figs. 6 and 7 are sections of further modifications and Fig. 8 is a section on line A—A¹ of Fig. 7.

The cock $a$, the discharge end only of which is shown, terminates in the known manner in a conical tube $b$ and is provided above said tube with a thread $c$. The end of the hose $d$ is passed over the tube $b$, whereupon the hollow cone $e$ is actuated by rotating the nut $f$ so that it rigidly grips the hose between said hollow cone $e$ and tube $b$. Up to this point the present invention presents no novelty over similar known devices.

The hollow cone $e$ is furnished with an outwardly extended flange at its upper end which is provided with an external thread $e'$, and in the lower part of the nut an annular groove is formed adapted to receive the threaded flange of the cone. The groove is here shown as made wider than the thickness of the flange. Threading the flange permits it to be turned onto the nut so that it may occupy a position in the groove thereof. When disposed in said groove its thread disengages the thread of the nut and the nut is, therefore, free to be turned independently, and thereby rotated with respect to the cone. When screwing the nut onto the conduit the bottom wall of the groove thereof engages the under side of the flange on the cone, and acts to draw the cone onto the hose and firmly grip it. On releasing the nut, its thread, which forms the top wall of the groove, bears upon the thread on the flange of the hollow cone $e$ and thus forces said cone away from the tube $b$. By making the groove in the nut wider than the thickness of the flange on the cone, it will be observed that the nut may be turned at the beginning of the releasing operation without moving the cone, and then by a further movement the nut will engage the cone and move it along by a direct thrust thereupon.

In the construction shown in Fig. 2, the flange of the hollow cone $e$ is not provided with a thread but an elastic split ring $h$ is arranged on said flange and hence becomes inserted in the groove $g$, examples of said ring being shown in Figs. 4 and 5. On insertion the ring is compressed and placed into the groove $g$, lying closely against the wall thereof owing to its spring tension. When the nut $f$ is disengaged the ring abuts against the edge of the thread extension and against the edge of the hollow cone $e$. This construction has over that shown in Fig. 1 the advantage that the ring can be quickly inserted and that when releasing the hollow cone the nut thread is not affected. Instead of the split elastic ring there may also be inserted a threaded ring $i$, as shown in Fig. 3, adapted to co-act with the thread in the nut.

In the construction shown in Fig. 6, the disconnection of the cone $e$ is not prevented by inserted rings or the like, but an annular groove $k$ is formed in the outer edge of the cone in which groove engage small screws $l$ carried by the nut. This method of connection does not hinder the movement or rotation of the nut and answers the same purpose as the constructions described above.

Figs. 7 and 8 show another construction in which the connection is effected by pins $m$ suitably united to a U-shaped bow, in order to permit of ready removal, said pins being passed through a rectangular boss $n$ on the nut so that they engage semi-circular grooves in the cone and nut, the cone being thus held in position and the same object obtained as by the previous means.

The present invention renders possible not only a quick and easy disengagement of the joint but also at the same time allows a connection of the nut with the hollow cone in order to avoid separation of said parts. Instead of the rings and insertions referred to above other means of suitable form and construction can be used.

In a similar manner in which the hose $d$ is connected to a cock tube as described, the connection of two hose lengths may be effected, the gripping device having only to be duplicated.

What I claim as my invention and desire to secure by Letters Patent of the United States is:—

1. A hose coupling comprising in combination a conduit having a tapered end, a hollow cone adapted to grip the hose against the tapered end of said conduit having an outwardly extended flange at its upper end, a nut adapted to be screwed onto the conduit having an internal, annular groove to receive said flange, the bottom wall of said groove engaging the under side of said flange when the nut is screwed onto the conduit to thereby draw the cone onto the hose, and the top wall of said groove engaging means on the flange when unscrewing said nut to thereby remove the cone, substantially as described.

2. A hose coupling comprising in combination a conduit having a tapered end, a hollow cone adapted to grip the hose against the tapered end of said conduit having an outwardly extended flange at its upper end, a ring resting on said flange, a nut adapted to be screwed onto the conduit having an external, annular groove to receive said flange, the bottom wall of said groove engaging the under side of said flange when the nut is screwed onto the conduit to thereby draw the cone onto the hose, and the top wall of said cone engaging said ring on the flange when unscrewing said nut to thereby remove the cone, substantially as described.

3. A hose coupling comprising in combination a conduit having a tapered end, a hollow cone adapted to grip the hose against the tapered end of said conduit having an outwardly extended flange at its upper end, a nut adapted to be screwed onto the conduit having an external annular groove to receive said flange which is made wider than the thickness of the flange, the bottom wall of said groove engaging the under side of said flange when the nut is screwed onto the conduit to thereby draw the cone onto the hose, and the top wall of said groove engaging means on the flange when unscrewing said nut to thereby remove the cone, substantially as described.

In witness whereof I have signed this specification in the presence of two witnesses.

PETER KRISCHER. [L. S.]

Witnesses:
OTTO KÖNIG,
WILLY BEINDE.